United States Patent
Cowles et al.

[15] 3,692,205
[45] Sept. 19, 1972

[54] DRIP PAN LNG TANK

[72] Inventors: Walter C. Cowles, Stamford, Conn.; Frank J. Iarossi, Middletown, N.J.

[73] Assignee: Esso Research and Engineering Company

[22] Filed: Feb. 27, 1970

[21] Appl. No.: 15,054

[52] U.S. Cl. .................. 220/9 LG, 114/74 A, 62/45
[51] Int. Cl. ............................................. B65d 25/18
[58] Field of Search ..62/45, 55; 114/74 A; 220/9 LG

[56] References Cited

UNITED STATES PATENTS 3,312,076  4/1967  Clarke et al. .................. 62/55
3,347,402  10/1967  Foreman et al. ...... 114/74 A X

*Primary Examiner*—Meyer Perlin
*Assistant Examiner*—Ronald C. Capossela
*Attorney*—Manahan and Wright and Jay Simon

[57] ABSTRACT

A container tank useful in the transportation of liquified gases at cryogenic temperatures in a tanker vessel comprises a primary liquid-tight barrier and a secondary liquid-tight barrier spaced apart from and surrounding the primary barrier and including a lower drip pan portion which is structurally integrated with the primary barrier and an upper splash shield portion which is structurally independent of but may be mechanically fastened to the primary barrier, i.e., the splash shield may be supported by the primary barrier but not structurally integral with said primary barrier.

10 Claims, 5 Drawing Figures

PATENTED SEP 19 1972 3,692,205

Walter C. Cowles
Frank J. Iarossi   INVENTORS

BY  *Jay Simon*   ATTORNEY

Walter C. Cowles
Frank J. Iarossi
INVENTORS

BY Jay Simon ATTORNEY

DRIP PAN LNG TANK

FIELD OF THE INVENTION

This invention relates to insulated containers and particularly to containers for transporting liquefied gases at cryogenic temperatures and atmospheric pressure. More particularly, this invention relates to an insulated container which comprises a primary liquid-tight barrier and a secondary liquid-tight barrier spaced apart from and surrounding the primary barrier. The secondary barrier contains a lower portion, referred to as a drip pan, which is structurally integrated with the primary barrier and an upper portion, referred to as a splash shield, which is structurally independent of but may be mechanically fastened to the primary barrier.

BACKGROUND OF THE INVENTION

In the transportation of liquefied gases at cryogenic temperatures, e.g., methane liquefies at −259°F., and at atmospheric pressure in tanker vessels whose hulls are constructed of ordinary carbon steel, it is extremely important to prevent the low temperature liquid from coming into contact with the hull. Thus, ordinary carbon steel is quite susceptible to embrittlement at low temperatures leading to the fracture of the hull plate structure. One approach to this problem has been to construct a fully redundant double-wall tank, i.e., wherein each wall is liquid-tight and of sufficient structural integrity to withstand the entire dynamic and static loads of the liquid contents of the tank. This technique was believed to provide the maximum degree of safety but only at high costs (since the second or outside barrier was only useful in the event of rupture of the inner or primary barrier). Of course, suitable insulating means were applied to the exterior of the secondary barrier to maintain the cryogenic temperature.

On the other hand, costs could be minimized by utilizing only a single wall container on the theory that the only type of failure that would occur would be a catastrophic failure, e.g., as would occur on a collision, and the hull would be ruptured anyway. However, this proposal does not take into account leaks or seepage from the tank due to fatigue cracks and also does not meet the safety regulations of many countries, thereby increasing the liability risks of the ship operators.

Other prior art tank designs have employed a double-wall construction wherein the primary and secondary barriers are completely integral structurally. This type of construction is very costly and has been found to be overdesigned in many respects and relatively difficult to manufacture.

Since technology advances have shown that a failure is most likely to be minor and not of a catastrophic nature, it is generally only necessary to provide a greater degree of protection against leaks with a lesser amount of protection for major failures. By the practice of this invention, however, the advantages of a secondary barrier containing a spray shield and drip pan are maintained and the disadvantages are overcome.

SUMMARY OF THE INVENTION

In accordance with this invention, therefore, a liquefied gas container, particularly suitable for use in a tanker vessel, is provided which has more than adequate reliability for meeting the highest safety standards but retains the economical features of single-wall tank construction. Thus, a container is provided which comprises a primary barrier, or inner wall, of sufficient strength and structural design to retain the enclosed cryogenic liquid, i.e., to withstand the static and dynamic loads produced by the liquid, and spaced apart from and surrounding the primary barrier is a liquid-tight outer wall, or secondary barrier, of a thickness generally thinner than the primary barrier and including a lower drip pan portion which is structurally integral with the primary barrier and an upper spray shield portion which is structurally independent of but may be mechanically fastened to the primary barrier in such a manner as to form a secondary spray-tight barrier. The purpose of the secondary wall is not to retain the entire static and dynamic loads of the liquid as in the integral double-wall tank of the prior art. Rather, the purpose of the secondary wall is to act as a liquid-tight receptacle surrounding the primary wall so that any small degree of seepage through the primary wall, e.g., due to fatigue cracking, etc., would not come in contact with the ship's hull and, furthermore, could be collected and pumped out of the space between the walls.

Now, the drip pan portion is structurally integrated with the primary barrier and extends the full bottom of the primary barrier and partially up the sides of that barrier. Thus, while this portion will be subject to the same stresses as the primary barrier, in this invention the distance between the barriers will be such that failures in the primary barrier cannot propagate to the drip pan. This distance can be readily estimated or calculated by one skilled in the art knowing the materials of construction, operating conditions, and design features, all of which are given herein. Consequently, by simply increasing the depth between the primary and secondary barriers to overcome crack propagation, a serious disadvantage of prior art proposals is eliminated. Additionally, however, several other distinct advantages are gained. Since the space between the barriers will now be on the order of 3 feet, this area is now accessible for inspection, maintenance, and construction, thereby eliminating one-side welding problems and readily allowing visible inspection of the primary barrier.

The upper portion of the secondary barrier, i.e., the spray shield, is formed by a composite of materials arranged to provide a spray-tight barrier and fastened to the primary wall such that each panel is fully restrained at only one point. Consequently, stresses on this portion will be minimized and the spray shield will not be affected by stresses on the primary wall. Also, removal of the upper portion of the secondary barrier will be relatively easy maintenance maintenace work is required in the space between the primary and secondary barriers.

As in prior art techniques, the insulation may be applied to the outside of the secondary barrier so that both the primary and secondary barriers will operate at substantially the same temperatures, i.e., there will be no substantial thermal gradient between the primary and secondary barriers. This location for the insulation eliminates the need for providing any elaborate differential expansion compensation means between the barriers which might otherwise be required. In addition, the transporting vessel need not contain an inner hull to support the spray shield or insulating.

DRAWING DESCRIPTION

This invention will be more fully understood by reference to the following description and drawings wherein.

Figure 1:
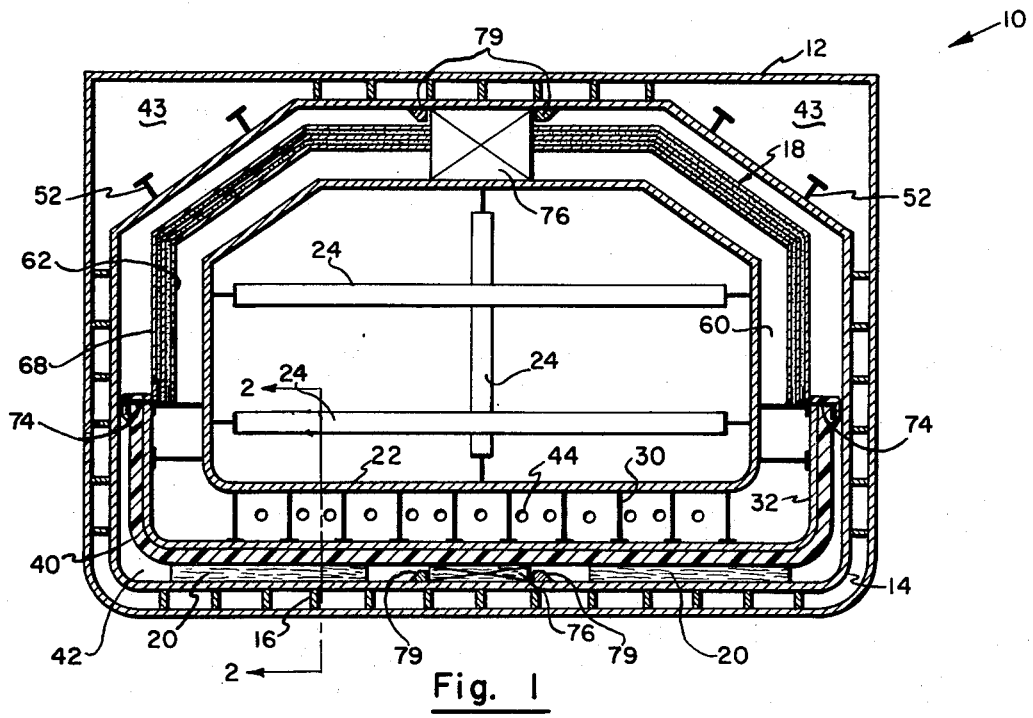
FIG. 1 is a cross-sectional view of the container as it would be mounted in a typical double-hull tanker vessel.
Figure 2:
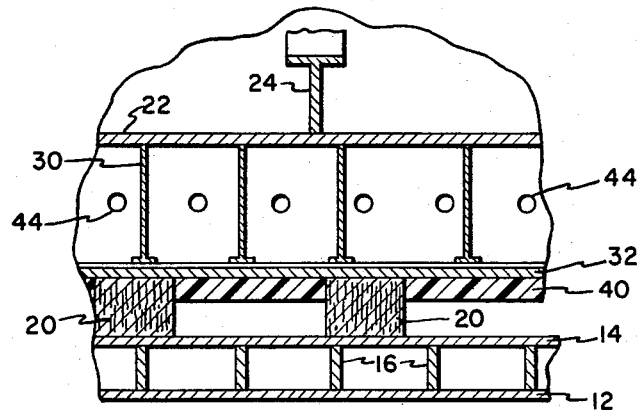
FIG. 2 is a fragmentary cross-sectional view taken along line 2–2 of FIG. 1 looking in the direction of the arrows.

Referring to the drawings in particular, FIGS. 1 and 2 show the ship's hull 10 in schematic cross section to include an outer steel hull portion 12 and an inner steel hull portion 14 maintained in spaced relationship with conventional structural plates 16. Within the hold of the hull this defined is an insulated cargo container 30 generally indicated at 18 supported at its bottom by a load-bearing insulation material such as wooden bearing strips 20.

The insulated cargo container 18 includes an inner wall or primary barrier 22 made structurally rigid by a plurality of internal web plates or bulkheads designated 24, which effectively divide the container into a plurality of compartments. These bulkheads run longitudinally as well as transversely within the confines of the inner wall 22 and may include a plurality of cutout portions bounded by reinforcing flanges, such as disclosed in the U.S. Pat. No. 3,312,076.

Extending longitudinally and, if desired, transversely as well, in egg-crate fashion, along the outside of the primary tank 22 are a plurality of T-shaped stringers or spacers 30. The T may be welded to the exterior of the primary tank 22 and to the interior of the secondary tank (drip pan portion 32) by a plurality of structural weld beads 38 (shown in FIG. 3). In previous designs, the space between tanks 22 and 32 was insufficient to permit welding to the interior of drip pan 32. This necessitated welding the drip pan to the spaces on the exterior or outside surface of the drip pan. Such a procedure is structurally much less preferred than the welding permitted in this invention. In one form of the invention, the primary barrier may comprise a low temperature construction metal such as aluminum and its alloys, stainless steel, 9 percent nickel steel, and the like, but preferably aluminum, and may be about one-half to three-fourths inch in thickness depending upon the design load and stress. The drip pan 32 is generally of a lesser predetermined thickness than the primary tank, again depending upon the working thickness for specified static or dynamic loading. A layer of insulation 40 is applied to the exterior surface of the outer wall portions of 32. The insulation 40 is preferably of a polyurethane foam, but may also be a polystyrene foam or any other suitable insulating medium, which may be applied by spraying or, in the alternative, fixed to the container in a series of interlocking panels. An air space 42, which may be in the order of 2 feet or so, is provided between the outside of the insulation 40 and the interior wall 14 of the tanker hull. The air space 42 is of sufficient size to permit periodic visual inspection of the exterior of the insulation.

Figure 3:
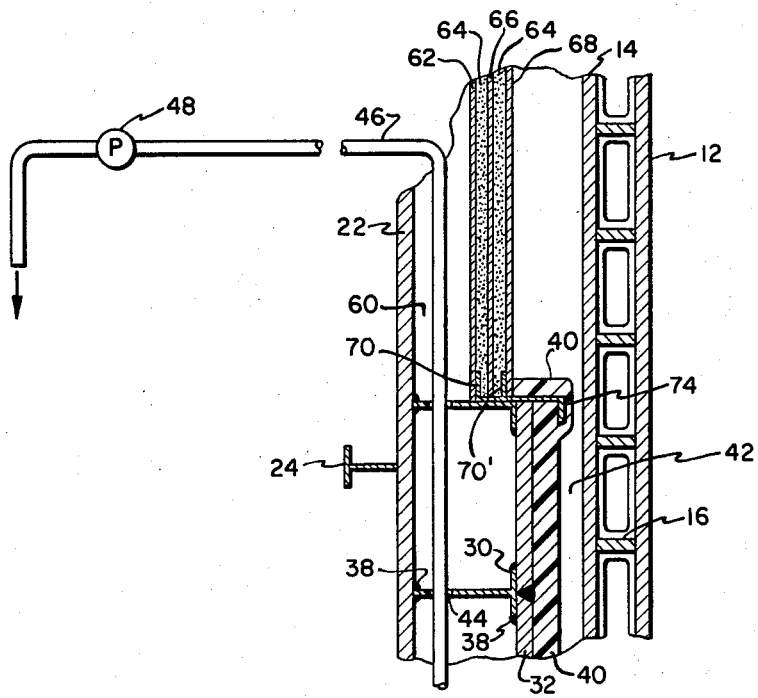
FIG. 3 is an enlarged fragmentary cross-sectional view showing means for removing liquid from the space between the two walls and the supporting of the spray shield.

Referring to FIG. 3 in detail, it may be seen how each of the stringers 30 includes a plurality of apertures 44 which are preferably in vertical alignment and permit the downward passage therethrough of a conduit 46 having a lower end which will be understood to terminate in the lower portion of the space between the inner and outer walls of the tank. Conduit 46 is connected to a pump 48 of conventional construction so that any seepage of liquid from the interior of the container into the space between the inner and outer walls may be readily removed by the action of the pump 48.

Figure 4:
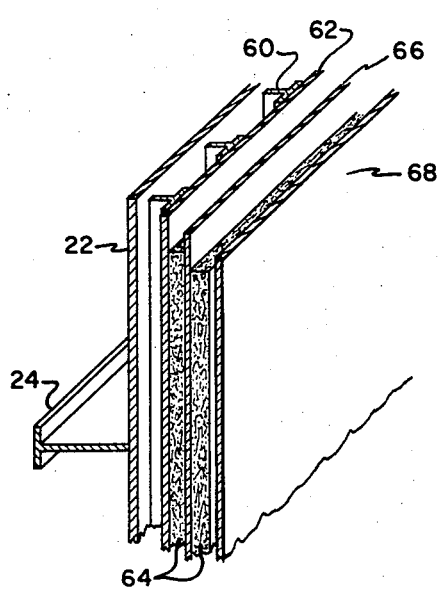
FIG. 4 is a perspective representation of the spray shield with its insulation and the supporting structure on the primary barrier.

Referring to FIG. 3 and FIG. 4, a substantially Z-shaped type connector 74 may be welded to spacer 30 and/or drip pan 32 for supporting the spray shield. Now it is important that there be no structural welds between the spray shield and the primary barrier or between the spray shield and the drip pan. Therefore, mechanical connections, e.g., rivets, studs or nonstructural welds are employed to position the spray shield. T-stiffeners 60 running vertically along the exterior of primary barrier 22 can be used to support, by mechanical connections, and space the spray shield from the primary barrier as well as giving structural integrity to the primary barrier. These stiffeners may also be located interiorly of the primary wall (and firring strips may be used on the exterior for mounting the spray shield) but are preferably located, as shown, for ease of construction. When the stiffeners are interior of the primary barrier, the previously-described interior sections of the tank may not be necessary although they are often preferred for reducing the tendency of the liquid to slosh about due to ship movement.

Mounted on the Z-shaped connector 74 (which forms a part of the secondary liquid-tight barrier) is the spray shield comprising an aluminum sheet or other impervious material, e.g., plywood 62, which acts to deflect leaks in the upper portion of the primary barrier downwardly into the drip pan. The laterally extending flanges 70—70' assist in accomplishing the desired deflection. Since connector 74 is in contact with internal sheet 62 it forms a thermal short and thus, it is necessary to overlay 74 with the insulation 40. This shield can be quite thin, e.g., on the order of one-sixteenth to one-eighth inch. The spray shield has a sandwich type insulation system with layers of foam insulation 64 mounted on the spray shield 62 and sandwiching a plywood structural barrier 66. The exterior of the spray shield insulation comprises preferably a single sheet of aluminum 68 which may be caulked or otherwise made tight at all joints with silicone or rubber beads. An alternate arrangement may comprise a shingle type construction with a downward overlap. The liquid-tight spray shield assembly thus provides a liquefied gas shield on its interior surface and a water shield on its external surface. The latter shield is important in that it provides protection for the insulation from water leaks in the hull or from ballast tanks (not shown) located between the inner and outer hulls at space 43 (shown in FIG. 1). The sandwich foam insulation is utilized so that there will not be a thermal bridge between the inner spray shield 62 and the outer aluminum sheathing 68. Thus, foam panels 64 can be mounted with metallic fasteners on plywood spacer 66 at staggered points without creating a thermal bridge. The insulation around the entire tank structure is thereby maintained without compromising its effectiveness.

Figure 5:
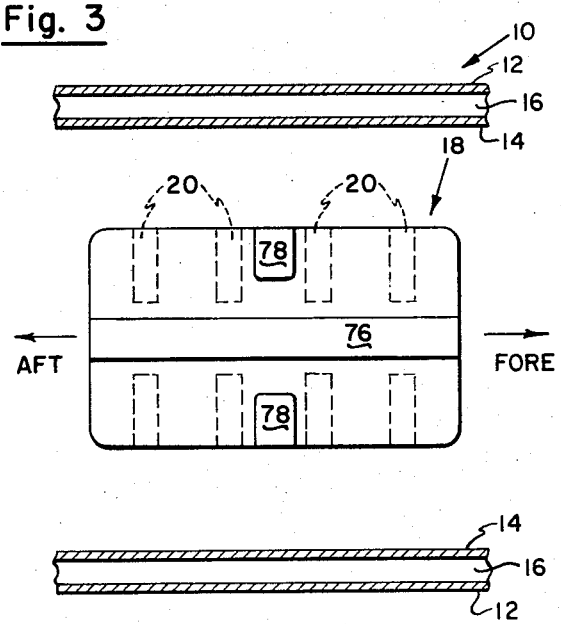
FIG. 5 is a top plan view of the container showing a keying arrangement.

Turning to FIG. 5, one exemplary manner in which the entire insulated cargo tank could be secured and located to the hull structure may be seen. As previously pointed out, the static load of the insulated cargo container is transmitted to the ship's hull through the load-bearing insulation 20, e.g., wood beams, at the bottom of the tank. The mounting of the novel insulated cargo container is such that it permits thermal expansion and contraction thereof. In the typical schematic arrangement shown, the top as well as the bottom walls (not shown) of the exterior wall of the cargo container 18 are provided with a keying arrangement comprising a key 76 extending longitudinally and two transversely disposed keys 78, which may be structurally integral with the container 18. Each key cooperates with a pair of guide blocks schematically shown in FIG. 1. at 79 to form A KEYWAY. The exterior sides of the keys are situated relative to the interior sides of the guide blocks, so that each key is located in the keyway in a slip-fit relationship. The guide blocks are conventionally secured in turn to the inner hull wall 14. In this manner of mounting of the cargo tank, substantially the entire load of the cargo within the container is transmitted through the bearing strips 20 to the hull structure. The keying arrangement restrains the tank from undesirable shifting within the tanker hold. Although one type of keying system has been disclosed it will be apparent to those skilled in the art that other suitable types of keying arrangements may be employed.

Referring again to FIG. 1, the upper portion of the hull structure 12 of the tanker forms the deck of the tanker, or the support for the deck. Additionally, the outside surface of the inner hull 14 at the upper portion of the tank is provided with a plurality of longitudinal T-shaped stiffener members 52 attached to the inner hull and extending into ballast space 43. Also shown schematically in FIG. 1 are top and bottom keys 76 which are constrained in guide blocks (not shown).

In another embodiment of this invention, the spray shield together with the drip pan need not completely envelop the primary barrier. Thus, for example, the spray shield can be omitted, if desired, from the top portion of the primary barrier. Any leak at the top of the primary barrier would cause liquid to trickle down along the exterior of the primary barrier and into the drip pan. However, it is generally preferred to have the spray shield continuous from one side of the drip pan to the other side and thereby form a continuous secondary liquid-tight barrier fully enclosing the primary liquid-tight barrier.

While a specific embodiment of this invention has been described and shown otherwise detail to illustrate the application of the inventive principles, it will be understood that the invention may be embodied together without departing from such principles.

What is claimed is:

1. A container for liquefied gases at cryogenic temperatures for use in a tanker which comprises, in combination: a primary tank of sufficient structural strength to contain the liquefied gas, said primary tank containing internal structural means fixed to the interior walls thereof; a larger liquid-tight secondary enclosure substantially similar in shape to said primary tank and completely surrounding said primary tank, said secondary enclosure containing a lower portion of predetermined thickness less than the thickness of the primary tank but sufficient to retain small quantities of the liquefied gases that may leak through said primary tank; thermally conductive structural means for maintaining said lower portion in spaced relationship and structurally integral with said primary tank, said structural means having sufficient depth to prevent failures in the primary tank from propagating to said lower portion; said secondary enclosure also containing a liquid-tight upper portion for deflecting seepage through upper portions of the primary tank into said lower portion; means for mechanically fastening said upper portion of said secondary enclosure to said lower portion and said primary tank solely for support and to permit relatively quick assembly and disassembly while maintaining said upper portion structurally independent of said primary tank and said lower portion; said lower portion being spaced at a first distance from the sides of said primary tank, and said upper portion being spaced at a second distance which is less than said first distance from said primary tank.

2. A container in accordance with claim 1 wherein thermal insulation means is secured externally to the entire surface of the upper and lower portions of said secondary enclosure.

3. A container in accordance with claim 1 wherein keying means are attached to said container for operable cooperation with the structure of said tanker for permitting relative movement therebetween, said keying means including at least a top and bottom longitudinally extending key-keyway.

4. A container in accordance with claim 3 wherein a plurality of transversely extending wooden bearing members are located between the bottom portion of said lower portion of said secondary enclosure and the hull of said tanker on either side of the bottom keykeyway, whereby the entire normal static load of said container and liquefied gas cargo is transmitted to the bottom hull of said tanker.

5. A container in accordance with claim 2 wherein the thermal insulation means applied to said upper portion of said secondary enclosure comprises a double layer of foam insulation sandwiching a thermally nonconductive member, said member acting to support the foam insulation, and an outer metallic covering over the outer layer of foam insulation which covering shields the foam insulation from leaks in the hull of said tanker.

6. The container in accordance with claim 1 wherein the secondary enclosure only substantially surrounds the primary tank.

7. A container in accordance with claim 1 wherein the mechanical fastening means includes a connector operably secured with said lower portion and said upper portion of said secondary enclosure and constructed and arranged for deflecting leaks in the upper portion of said primary tank downward into said lower portion.

8. A container in accordance with claim 5 wherein said outer metallic covering comprises a shingle-type arrangement with a downward overlap.

9. A container for liquefied gases at cryogenic temperatures for use in a tanker which comprises, in combination: a primary tank of sufficient structural strength to contain the liquefied gas, said primary tank containing internal structural means fixed to the interior walls thereof; a larger liquid-tight secondary enclosure substantially similar in shape to said primary tank and completely surrounding said primary tank, said secondary enclosure containing a lower portion of predetermined thickness less than the thickness of the primary tank but sufficient to retain small quantities of the liquefied gases that may leak through said primary tank; thermally conductive structural means for maintaining said lower portion in spaced relationship and structurally integral with said primary tank, said structural means having sufficient depth to prevent failures in the primary tank from propagating to said lower portion; said secondary enclosure also containing a liquid-tight upper portion for deflecting seepage through upper portions of the primary tank into said lower portion; means for mechanically fastening said upper portion of said secondary enclosure to said lower portion and said primary tank solely for support and to permit relatively quick assembly and disassembly while keeping said upper portion structurally independent of said primary tank and said lower portion; top and bottom keying means operably disposed between said container and the adjacent structure of said tanker for restraining said container from undesirable shifting while permitting relative movement therebetween, each of said top and bottom keying means including a key-keyway extending longitudinally along the centerline of the container and a pair of transverse key-keyways located on either side of the longitudinal key-keyway substantially at the midpoint thereof.

10. A container in accordance with claim 9 wherein a plurality of transversely extending load bearing insulation members are spaced longitudinally along the bottom of said container on either side of the longitudinally extending bottom key-keyway.

* * * * *